(12) United States Patent
Cooper et al.

(10) Patent No.: US 8,741,242 B2
(45) Date of Patent: Jun. 3, 2014

(54) $NO_x$ STORAGE COMPONENT

(75) Inventors: Jonathan Ashley Cooper, Bishops Stortford (GB); Michael Anthony Howard, Royston (GB)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 13/880,235

(22) PCT Filed: Oct. 20, 2011

(86) PCT No.: PCT/IB2011/002517
§ 371 (c)(1),
(2), (4) Date: Apr. 18, 2013

(87) PCT Pub. No.: WO2012/052835
PCT Pub. Date: Apr. 26, 2012

(65) Prior Publication Data
US 2013/0209337 A1 Aug. 15, 2013

Related U.S. Application Data

(60) Provisional application No. 61/413,550, filed on Nov. 15, 2010.

(30) Foreign Application Priority Data

Oct. 22, 2010 (GB) .................................. 1017870.5

(51) Int. Cl.
| | | |
|---|---|---|
| *B01D 53/94* | (2006.01) |
| *B01D 53/56* | (2006.01) |
| *B01J 8/02* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01G 28/00* | (2006.01) |
| *C01G 30/00* | (2006.01) |
| *B01J 20/00* | (2006.01) |
| *B01J 21/00* | (2006.01) |
| *B01J 21/04* | (2006.01) |
| *B01J 23/00* | (2006.01) |
| *B01J 23/02* | (2006.01) |
| *B01J 23/04* | (2006.01) |
| *B01J 23/06* | (2006.01) |
| *B01J 23/08* | (2006.01) |
| *B01J 23/10* | (2006.01) |
| *B01J 23/32* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 23/58* | (2006.01) |
| *B01D 50/00* | (2006.01) |

(52) U.S. Cl.
USPC ........ 423/213.5; 502/243; 502/250; 502/261; 502/262; 502/263; 502/304; 502/324; 502/326; 502/327; 502/328; 502/330; 502/332; 502/333; 502/334; 502/339; 502/340; 502/341; 502/344; 502/349; 502/350; 502/351; 502/355; 502/415; 502/439; 502/527.12; 502/527.13; 502/527.19; 422/170; 422/177; 422/180

(58) Field of Classification Search
CPC ............ B01J 23/02; B01J 23/04; B01J 23/06; B01J 23/08; B01J 23/10; B01J 23/16; B01J 23/34; B01J 23/40; B01J 23/42; B01J 23/44; B01J 23/58; B01J 23/63; B01J 23/64; B01J 23/894; B01J 23/8946; B01J 23/8986; B01J 21/04; B01J 21/06; B01J 21/08; B01J 21/10; B01J 21/12; B01J 21/14; B01J 20/04; B01J 20/08; B01J 20/10; B01J 20/103; B01J 20/22; B01J 50/00; B01J 53/9422
USPC ................ 502/243, 250, 261–263, 304, 324, 502/326–328, 330, 332–334, 339–341, 344, 502/349–351, 355, 415, 439, 527.12, 502/527.13, 527.19; 423/213.5; 422/170, 422/177, 180

See application file for complete search history.

(56) References Cited

U.S. PATENT DOCUMENTS

| | | | |
|---|---|---|---|
| 5,451,558 | A | 9/1995 | Campbell et al. |
| 5,473,887 | A | 12/1995 | Takeshima et al. |
| 6,497,848 | B1 | 12/2002 | Deeba et al. |
| 6,617,276 | B1 | 9/2003 | Ballinger et al. |
| 6,727,202 | B2 | 4/2004 | Deeba et al. |
| 6,818,582 | B2 * | 11/2004 | Maunula .................. 502/73 |
| 7,135,429 | B2 * | 11/2006 | Raman et al. ................ 502/232 |
| 7,147,892 | B2 | 12/2006 | Aderhold et al. |
| 7,438,739 | B2 * | 10/2008 | Ziebarth et al. ................ 55/523 |
| 8,151,742 | B2 * | 4/2012 | Ishimaru et al. ................ 123/3 |
| 8,418,444 | B2 * | 4/2013 | Ikeda et al. ................ 60/295 |
| 8,496,899 | B2 * | 7/2013 | Imai .................. 423/239.1 |
| 2002/0082164 | A1 | 6/2002 | Dou et al. |
| 2002/0098967 | A1 * | 7/2002 | Morena et al. ................ 501/128 |
| 2002/0132724 | A1 * | 9/2002 | Labarge et al. ................ 502/64 |
| 2006/0035782 | A1 | 2/2006 | Jen et al. |
| 2007/0048494 | A1 * | 3/2007 | Miyairi et al. ................ 428/116 |
| 2007/0077190 | A1 * | 4/2007 | Ohno .................. 423/345 |
| 2008/0045405 | A1 * | 2/2008 | Beutel et al. ................ 502/103 |
| 2009/0163356 | A1 | 6/2009 | Nilsson et al. |
| 2010/0146935 | A1 * | 6/2010 | Chen et al. ................ 60/276 |
| 2010/0183490 | A1 * | 7/2010 | Hoke et al. ................ 423/213.5 |
| 2011/0270007 | A1 * | 11/2011 | Chinta et al. ................ 585/468 |
| 2012/0036840 | A1 * | 2/2012 | Nam et al. ................ 60/286 |

FOREIGN PATENT DOCUMENTS

| | | |
|---|---|---|
| EP | 1264629 A1 | 12/2002 |
| WO | 9702886 A1 | 1/1997 |
| WO | 0222241 A1 | 3/2002 |

OTHER PUBLICATIONS

GB Search Report dated Dec. 22, 2010 for corresponding application GB1017870.5.

International Search Report dated Jan. 6, 2012 for corresponding international Application No. PCT/IB2011/002517.

\* cited by examiner

*Primary Examiner* — Cam N. Nguyen

(74) *Attorney, Agent, or Firm* — Kevin M. Carroll

(57) ABSTRACT

A $NO_x$ storage component comprises caesium silicate ($Cs_2SiO_3$) and at least one platinum group metal. The invention also includes a $NO_x$ absorber catalyst comprising a $NO_x$ storage component according to the invention disposed on a substrate monolith; a method of treating exhaust gas containing $NO_x$ from a lean burn internal combustion engine comprising the steps of contacting a $NO_x$ storage component comprising caesium silicate (Cs2SiO3) and at least one platinum group metal with lean exhaust gas containing $NO_x$ to adsorb $NO_x$ thereon; and periodically desorbing adsorbed $NO_x$ by contacting the $NO_x$ storage component with stoichiometric or rich exhaust gas; and a method of making a $NO_x$ storage component according to the invention comprising the steps of combining and reacting an aqueous salt of at least one platinum group metal, an aqueous caesium salt and a source of silica.

15 Claims, 1 Drawing Sheet

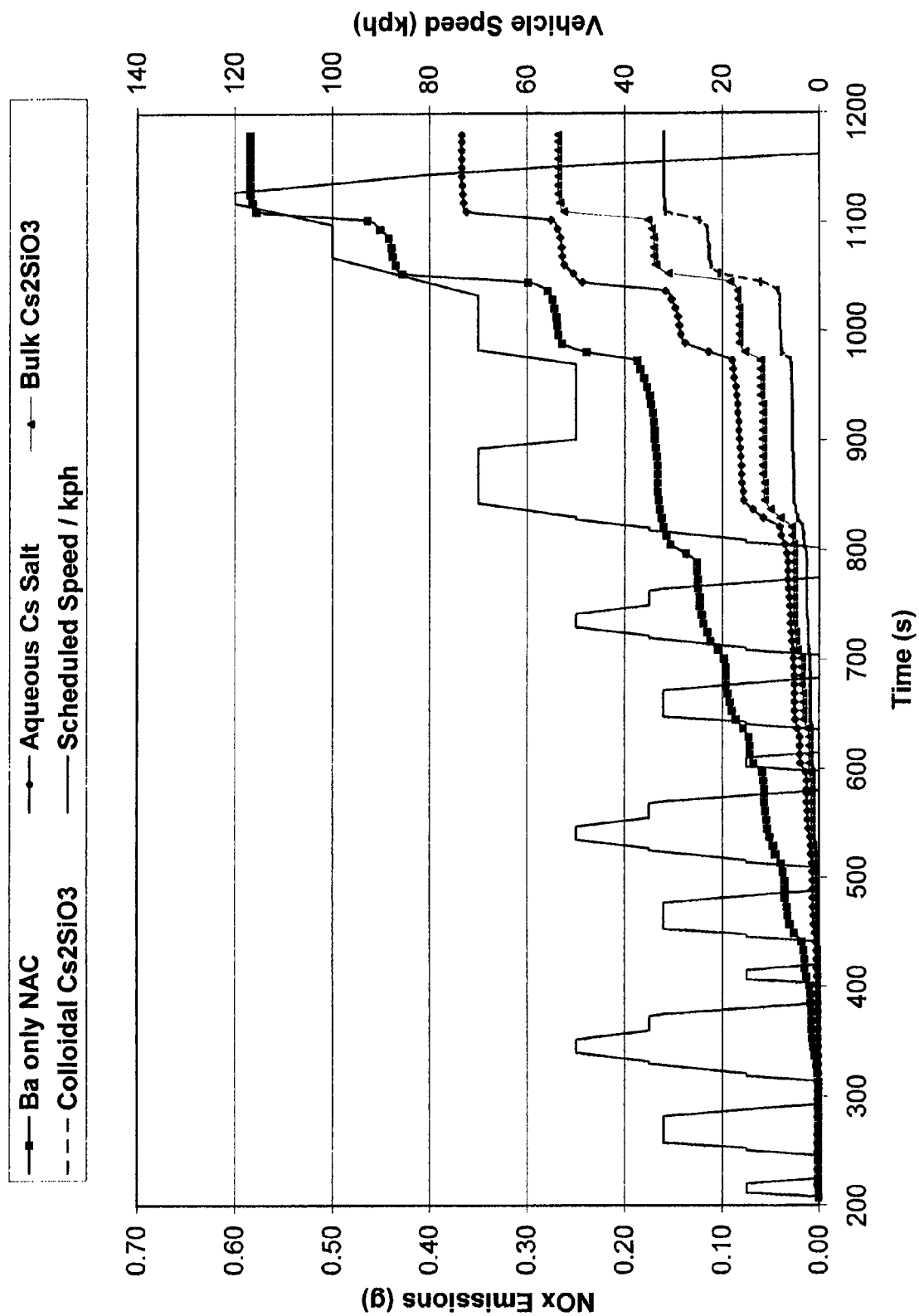

$NO_x$ STORAGE COMPONENT

CROSS-REFERENCE TO RELATED APPLICATIONS

This application is the U.S. national stage application, under 35 U.S.C. §371, of International Application PCT/IB2011/002517, filed Oct. 20, 2011, claiming priority to United Kingdom Application No. 1017870.5, filed on Oct. 22, 2010 and U.S. Provisional Application No. 61/413,550, filed on Nov. 15, 2010; the disclosures of International Application PCT/IB2011/002517, United Kingdom Application No. 1017870.5, and U.S. Provisional Application No. 61/413,550, each as filed, are incorporated herein by reference.

FIELD OF THE INVENTION

The present invention relates to a novel NO storage component and to a $NO_x$ absorber catalyst (NAC) comprising it for use in treating exhaust gas from vehicles powered by lean burn internal combustion engines including vehicles powered by hybrid power sources e.g. both an electric motor and a lean burn internal combustion engine. $NO_x$ absorber catalysts according to the invention have particular application for treating exhaust gas from vehicular internal combustion engines, such as compression ignition (e.g. Diesel engines) and positive ignition engines, such as lean-burn gasoline engines.

BACKGROUND OF THE INVENTION $NO_x$ absorber catalysts (NACs) are known e.g. from U.S. Pat. No. 5,473,887 and are designed to adsorb nitrogen oxides ($NO_x$) from lean exhaust gas (lambda>1) and to desorb the $NO_x$ when the oxygen concentration in the exhaust gas is actively—as opposed to passively—decreased. Such active decrease in oxygen concentration is known as "regeneration" of the NAC's $NO_x$ adsorption activity or a "purge" of $NO_x$ adsorbed on a NAC. Desorbed $NO_x$ may be reduced to $N_2$ with a suitable reductant, e.g. gasoline fuel, promoted by a catalyst component, such as rhodium, of the NAC itself or located downstream of the NAC. In practice, oxygen concentration can be actively adjusted to a desired redox composition intermittently in response to a calculated remaining $NO_x$ adsorption capacity of the NAC, e.g. to richer than normal engine running operation (but still lean of stoichiometric, i.e. lambda=1 composition), to stoichiometric or to rich of stoichiometric (lambda<1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation disclosed in the prior art includes a catalytic oxidation component, such as platinum, a significant quantity, i.e. substantially more than is required for a promoter, of a $NO_x$-storage component, typically an alkali metal or alkaline earth metal such as barium, and a reduction catalyst, e.g. rhodium. One mechanism commonly given for $NO_x$-storage from a lean exhaust gas for this formulation is:

$$NO + \tfrac{1}{2}O_2 \rightarrow NO_2 \quad (1); \text{ and}$$

$$BaO + NO_2 + \tfrac{1}{2}O_2 \rightarrow Ba(NO_3)_2 \quad (2),$$

wherein in reaction (1), the nitric oxide reacts with oxygen on active oxidation sites on the platinum to form $NO_2$. Reaction (2) involves adsorption of the $NO_2$ by the storage material in the form of an inorganic nitrate.

At lower oxygen concentrations and/or at elevated temperatures, the nitrate species become thermodynamically unstable and decompose, producing NO and/or $NO_2$ according to reaction (3) below. In the presence of a suitable reductant, these nitrogen oxides are subsequently reduced by carbon monoxide, hydrogen and hydrocarbons to $N_2$, which can take place over the reduction catalyst (see reaction (4)).

$$Ba(NO_3)_2 \rightarrow BaO + 2NO + \tfrac{3}{2}O_2 \text{ or } Ba(NO_3)_2 \rightarrow BaO + 2NO_2 + \tfrac{1}{2}O_2 \quad (3); \text{ and}$$

$$NO + CO \rightarrow \tfrac{1}{2}N_2 + CO_2 \quad (4);$$

(Other reactions include $Ba(NO_3)_2 + 8H_2 \rightarrow BaO + 2NH_3 + 5H_2O$ followed by $NH_3 + NO_x \rightarrow N_2 + yH_2O$ or $2NH_3 + 2O_2 + CO \rightarrow N_2 + 3H_2O + CO_2$ etc.).

In the reactions of (1)-(4) above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream, or for use with other alkaline earth metals such as Sr, Mg or Ca or alkali metals such as K or Cs.

Alkali metal-based $NO_x$ storage components have relatively high levels of $NO_x$ storage, so their use is desirable. However, there are a number of drawbacks in their use. These include migration of alkali metal from a catalyst into a ceramic monolith substrate on which the catalyst is coated, vaporisation of alkali metals during ageing of the catalyst in use, leaching of alkali metals by liquid water present in an exhaust system e.g. during engine cold-start, migration of alkali metals between layers in a catalytic washcoat and reduction of the hydrocarbon conversion efficiency by Pt (on this last drawback, see WO 02/22241).

The prior art discloses a number of $NO_x$ storage components. For example, U.S. Pat. No. 6,497,848 discloses a catalytic trap effective for conversion of NOx in an exhaust gas stream which is inert to high-temperature reaction with basic oxygenated compounds of lithium, sodium or potassium. The catalytic trap is substantially free of silica components and may include a catalytic trap material which contains a refractory metal oxide support, e.g., alumina, having dispersed thereon a catalytic component, such as a platinum group metal catalytic component, and a NOx sorbent comprised of one or more of the basic oxygenated compounds.

U.S. Pat. No. 6,727,202 discloses a catalytic trap comprising a catalytic trap material and a refractory carrier member on which the catalytic trap material is disposed. The catalytic trap material comprises: (i) a refractory metal oxide support; (ii) a catalytic component effective for promoting the reduction of NOx under stoichiometric or rich conditions; and (iii) a NOx sorbent effective for adsorbing the NOx under lean conditions and desorbing and reducing the NOx to nitrogen under stoichiometric or rich conditions. The NOx sorbent comprises a metal oxide selected from the group consisting of one or alkali metal oxides, alkaline earth metal oxides and mixtures of one or more alkali metal oxides and alkaline earth metal oxides. The manganese component is selected from the group consisting of: (1) a manganese oxide, (2) a mixed oxide of manganese and a transition metal and/or a rare earth metal, (3) a compound of an alkali metal and a manganese oxide, (4) a compound of an alkaline earth metal and a manganese oxide and (5) mixtures of the foregoing oxides and compounds. The combination in component (a) of an alkali metal oxide and silica or any siliceous compound is expressly excluded.

WO 97/02886 discloses a NOx abatement composition comprises a NOx abatement catalyst and a NOx sorbent material, which are dispersed in proximity to, but segregated from, each other on a common refractory carrier member. The NOx sorbent material comprises a basic oxygenated metal compound and optionally further comprises ceria. The NOx abatement catalyst contains a catalytic metal component including a platinum metal catalytic component. The catalytic metal component is segregated from the NOx sorbent material, which may be one or more of metal oxides, metal carbonates, metal hydroxides and mixed metal oxides. At least the catalytic metal component and the NOx sorbent material must be on, or comprise separate, particles; the particles may either be admixed or may be disposed in separate layers on the carrier member.

U.S. Pat. No. 5,451,558 discloses a method of decreasing the level of NOx, CO and $SO_2$ emissions in a gas turbine. A catalyst absorber, preferably made of alumina/platinum/carbonate salt, is used to oxidize the pollutant oxides and absorb them.

US 2006/0035782 discloses a coarsening resistant automotive exhaust catalyst composition comprising a metal or metal-containing compound and a component having alkali metal or an alkaline-earth metal ions bonded to a conjugate base oxide of an inorganic acid. The inorganic acid for which the base oxide is conjugate has a Ka such that the automotive exhaust catalyst composition resists phase transitions that reduce surface area. The present invention also provides a NOx trap which incorporates the exhaust catalyst composition of the invention.

WO 02/22241 discloses a NOx-trap composition comprising: (a) at least one first NOx storage component comprising at least one alkali metal supported on at least one first support material; and (b) a platinum oxidation catalyst and at least one second NOx storage component not being an alkali metal supported on at least one second support material, whereby the platinum oxidation catalyst and the at least one alkali metal are physically segregated thereby susbtantially maintaining the hydrocarbon conversion activity of the platinum oxidation catalyst.

Historically, vehicular Diesel engines have been designed to meet some combination of four features: fuel efficiency; control of $NO_x$ emissions; power output; and particulate matter control. Early emission standards limited the quantity of carbon monoxide and hydrocarbon that it was permissible to emit, which forced fitment of Diesel oxidation catalysts to meet the standards. By the inception of Euro 5 emission standards were most easily met by tuning the engine to control $NO_x$ emissions and providing a filter in the exhaust system to trap particulate matter (the so-called $NO_x$/particulate matter trade-off). For Euro 6 and proposals in the US, it appears to be difficult to meet particulate emission standards (which now include a requirement to reduce particulate number emissions) without a filter, whether additional catalyst-based $NO_x$ removal strategies are required in addition. Whilst it is possible, therefore, to conceive of an exhaust system comprising a $NO_x$ absorber catalyst on a flow-through substrate monolith in the absence of a filter for use in meeting e.g. European emission standards, generally we expect that a system comprising a $NO_x$ absorber catalyst on a flow-through substrate will be used in some combination with a filter, or that the $NO_x$ absorber catalyst will be coated on a filter substrate monolith, e.g. a wall-flow filter.

A typical exhaust system arrangement for a light-duty Diesel vehicle comprises a $NO_x$ absorber catalyst on a flow-through substrate monolith and a catalysed soot filter (CSF) disposed downstream (i.e. in the ordinary flow direction) thereof. Typical problems associated with $NO_x$ absorber catalyst development for use in such systems include $NO_x$ storage and $NO_x$ regeneration under low temperature, relatively high flow rate and relatively high hydrocarbon exhaust gas conditions. Modern Diesel vehicles generally use an engineering solution known as exhaust gas recirculation (EGR) in order better to control $NO_x$ emissions, wherein a portion of the exhaust gas is recirculated to the engine inlet during at least some of an internally programmed engine speed/load map. The point in the exhaust system from where the exhaust gas for EGR is taken contributes to the above problems. One typical arrangement is to take EGR exhaust gas from downstream of the CSF, so-called low pressure (or "long-loop") EGR.

SUMMARY OF THE INVENTION

We have found, very surprisingly, that caesium can be stabilised by forming a caesium silicate so that the above-mentioned drawbacks are reduced or avoided, yet it remains active for cyclical $NO_x$ adsorption and desorption according to reactions (2) and (3) hereinabove. Stabilising the caesium leads to more of it being retained in the washcoat during catalyst ageing and so the $NO_x$ trap has better performance According to the present invention there is provided a $NO_x$ storage component comprising caesium silicate ($Cs_2SiO_3$) and at least one platinum group metal.

A useful advantage of caesium silicate is that it is insoluble in water, so it is less likely that caesium would be removed and volatilised following engine cold-start.

BRIEF DESCRIPTION OF THE DRAWING

In order that the invention is more fully understood, the following Examples are provided by way of illustration only and with reference to the accompanying drawings, in which:

FIG. 1 is a graph comparing the cumulative tail-pipe $NO_x$ emissions from a motor vehicle fitted with a two-layer (i.e. fully formulated) $NO_x$ absorber catalyst (NAC) comprising caesium silicate according to the invention with Comparative NACs without caesium or containing only soluble caesium.

DETAILED DESCRIPTION OF THE INVENTION

Whilst we found through experimentation that the advantages of the present invention can be obtained using commercially available "bulk" caesium silicate (obtained from Alfa Aesar), we found that a caesium silicate sol comprising at least one platinum group metal prepared by reaction of a colloidal silica and aqueous caesium nitrate in the presence of an aqueous platinum group metal salt gave significantly better performance. We believe that this is because the particle size of the colloidal silica used (particle diameter ~22 nm) resulted in very small particles of caesium silicate in the washcoat. The bulk $Cs_2SiO_3$ used had a relatively large particle size and for this reason we believe that the resulting $NO_x$ storage and release performance was limited.

In $NO_x$ storage components wherein the caesium silicate is supported on a refractory metal oxide, the refractory metal oxide support may be selected from the group consisting of alumina, silica, magnesia, amorphous silica-alumina, titania, zirconia, bulk ceria, a molecular sieve or a mixture, composite oxide or mixed oxide of any two or more thereof. A particular refractory metal oxide is an homogeneous magnesium aluminate. We have investigated a number of homogeneous magnesium aluminates for use in the $NO_x$ absorber catalysts and have found that, where the homogeneous magnesium aluminate is represented as $MgO \cdot nAl_2O_3$, $n \geq 1.5$ are preferred. A particularly preferred homogeneous magnesium aluminate is where n is 4.

To improve hydrothermal stability, the refractory metal oxide support may be doped with one or more of silica and rare-earths, e.g. lanthanum, neodymium, yttrium etc.

As used herein the term "bulk" to refer to a reducible oxide such as ceria (or any other component) means that the ceria is present as solid particles thereof. These particles are usually very fine, of the order of at least 90 percent of the particles being from about 0.5 to 15 microns in diameter. The term "bulk" is intended to distinguish from the situation in which ceria is "dispersed" on a refractory support material e.g. by being impregnated into the support material from a solution e.g. cerium nitrate or some other liquid dispersion of the component and then dried and calcined to convert the impregnated cerium nitrate to a dispersion of ceria particles on a surface of the refractory support. The resultant ceria is thus "dispersed" onto and, to a greater or lesser extent, within a surface layer of the refractory support. The dispersed ceria is not present in bulk form, because bulk ceria comprises fine, solid particles of ceria.

In embodiments, the or each platinum group metal present in the $NO_x$ storage component is selected from the group consisting of platinum, palladium, rhodium and mixtures of any two or more thereof. However, in a preferred embodiment for use in a fully formulated layered $NO_x$ absorber catalyst (see Examples), the platinum group metal present in the $NO_x$ storage component is rhodium.

In a preferred embodiment, the refractory oxide support also supports a rare earth oxide, such as ceria or praseodymia, preferably ceria.

The prior art shows that manganese can promote the ability of $NO_x$ storage components such as barium (see U.S. Pat. No. 6,727,202). We have found that manganese can promote the activity of a $NO_x$ storage component according to the present invention comprising caesium silicate.

According to a further aspect, the invention provides a $NO_x$ absorber catalyst comprising a $NO_x$ storage component according to the present invention disposed on a substrate monolith.

According to one embodiment, a $NO_x$ absorber catalyst according to the invention comprises at least one alkaline earth metal.

In a preferred arrangement, the $NO_x$ absorber catalyst comprises two or more layers, wherein the caesium silicate $NO_x$ storage component is disposed in a first layer and the at least one alkaline earth metal is disposed in a second layer. In a particularly preferred arrangement, the first layer is disposed above the second layer, either by lying directly on the second layer or wherein one (or more) layers are interposed between the first and the second layers.

In a preferred embodiment, the second layer comprises platinum, palladium or both platinum and palladium.

According to a further aspect, there is provided an exhaust system for a lean-burn internal combustion engine comprising a $NO_x$ absorber catalyst according to the invention.

In a further aspect, there is provided a motor vehicle comprising an exhaust system according to the invention.

According to a further aspect, there is provided a method of treating exhaust gas containing $NO_x$ from a lean burn internal combustion engine, which method comprising the steps of contacting a $NO_x$ storage component comprising caesium silicate ($Cs_2SiO_3$) and at least one platinum group metal with lean exhaust gas containing $NO_x$ to adsorb $NO_x$ thereon; and periodically desorbing adsorbed $NO_x$ by contacting the $NO_x$ storage component with stoichiometric or rich exhaust gas.

According to a further aspect, there is provided a method of making a $NO_x$ storage component according to the invention, which method comprising the steps of combining and reacting an aqueous salt of at least one platinum group metal, an aqueous caesium salt and a source of silica.

Preferably, the source of silica is colloidal silica, i.e. a sol, e.g. particle diameter of the order of 22 nm, which is available commercially as Ludox (W.R. Grace & Co.) Alternatively, the source of silica can be zeolites, amorphous silica-aluminas, particulate silicas or water-soluble silica compounds. We have prepared a component of the $NO_x$ storage component by combining particulate silica (S30) with an aqueous caesium salt (caesium nitrate ($CsNO_3$)) and then spray drying the resulting slurry, and then calcining the resulting product. The resulting caesium silicate was then combined with an aqueous platinum group metal and the composition was then dried and calcined to yield the $NO_x$ storage component according to the present invention.

An alternative method of in situ preparation is to load, e.g. by impregnation, a caesium salt onto a suitable support, e.g. alumina, and then combining this component with a silica source component supporting at least one platinum group metal in the same layer, or by the co-precipitation of a aqueous caesium salt and an aqueous silicon salt onto a suitable support and combining this with an aqueous platinum group metal, or by disposing the supported caesium component in $NO_x$ absorber catalyst formulation in a layer below a layer comprising a source of silica component supporting at least one platinum group metal. In use, the caesium may migrate away from the original support material, but when it contacts the silica source in the overlayer it may form caesium silicate.

EXAMPLES

Comparative Example 1

Preparation of Ba Only NAC

A first layer washcoat was prepared by slurrying a high surface area gamma alumina with water and then adding appropriate quantities of Pt and Pd solution. The Pt and Pd content of the finished washcoat was 0.41 and 0.17% respectively. Ba was then added to the washcoat as the acetate salt. The Ba loading in the finished catalyst was 600 $g/ft^3$.

The washcoat was coated onto a ceramic honeycomb substrate monolith of dimensions 4.16×4.5 inches with a cell density of 400 having cell wall thickness of 4 thousandths of an inch using the method described in U.S. Pat. No. 7,147,892. The coating was then dried at 100° C. in air and subsequently calcined at 550° C. in air.

A second layer washcoat was prepared by slurrying in water a high surface area zirconia doped with rare earth metals lanthanum and neodymium and a high surface area gamma alumina. Rhodium nitrate was subsequently added to the washcoat. The Rh content of the finished washcoat was 0.062%. Cerium nitrate was then added to give a Ce loading of 400 $g/ft^3$. This washcoat was then coated over the previous dried and calcined layer using the method described above and the resulting part was dried and calcined using the same conditions as for the first layer.

Comparative Example 2

Preparation of NAC Containing Ba and Soluble Cs

The first layer was prepared and coated onto an identical substrate monolith as described in Comparative Example 1.

The second layer washcoat was prepared identically to Comparative Example 1, except in that caesium nitrate was added to the washcoat after addition of the rhodium nitrate and before addition of the Ce to give a Cs loading in the finished catalyst of 200 g/ft³.

Example 3

Preparation of NAC Containing Ba and Bulk Cs₂SiO₃

The first layer was prepared and coated onto an identical substrate monolith as described in Comparative Example 1.

The second layer washcoat was prepared identically to Comparative Example 1, except in that caesium silicate (Alfa Aesar) was added into the washcoat after addition of the rhodium nitrate and before addition of the Ce to give a Cs loading in the finished catalyst of 200 g/ft³.

Example 4

Preparation of and NAC Containing Ba and Colloidal Cs₂SiO₃

The first layer was prepared and coated onto an identical substrate monolith as described in Comparative Example 1.

The second layer was prepared by slurrying in water a high surface area zirconia doped with rare earth metals lanthanum and neodymium and a high surface area gamma alumina. Rhodium nitrate was subsequently added to the washcoat. Colloidal silica (Ludox AS40 (W.R. Grace & Co.)) and caesium nitrate were then added to the washcoat. Sufficient Cs was added to give a Cs loading in the finished catalyst of 200 g/ft³. Sufficient Ludox was added to give a Cs to Si atomic ratio in the finished catalyst of 2:1. Cerium nitrate was then added to give a Ce loading of 400 g/ft³. This washcoat was then coated over the previous dried and calcined layer using the method described above and the resulting part was dried and calcined using the same conditions as for the first layer.

Example 5

Catalyst Testing

The fresh catalyst coated substrate monoliths ("bricks") of Comparative Examples 1 and 2 and Examples 3 and 4 according to the invention were aged in the exhaust system of a bench-mounted 4.5 liter V8 gasoline engine controlled to run at lambda 1 with periodic lean spikes. The NAC were located in a position corresponding to an underfloor location of a motor vehicle downstream of a close-coupled three-way catalyst. The engine was run using a load sufficient to generate an in-brick temperature of 830° C. The complete ageing cycle per brick was 32 hours.

Each Example brick were inserted in the exhaust system of a commercially available vehicle 3.5 liter direct injection lean burn gasoline engine in place of the existing underfloor NAC originally fitted by the manufacturer. In addition the manufacturer-fitted close-coupled three-way catalyst was replaced with the Applicant's three-way catalyst that had been aged using the same ageing cycle as described in the preceding paragraph. The vehicle was run over the European MVEG-B cycle (see scheduled vehicle speed profile in FIG. 1) and the tailpipe NOₓ emissions were logged and are presented in FIG. 1.

It can be seen from the FIGURE that the NAC of Comparative Example 1 (labelled Ba only NAC) performs less well than the NAC of Comparative Example 2 (labelled Aqueous Cs salt), where soluble caesium was also included in its manufacture. However, it can be seen from a comparison of the trace for Comparative Example 2 and Example 3 (labelled Bulk Cs₂SiO₃) that Example 3 has far superior results. This is possibly because the soluble caesium may have migrated into the ceramic substrate monolith, vaporised or migrated from the overlayer to the underlayer during catalyst ageing. A further substantial advantage can be seen when the in situ technique of preparing colloidal Cs₂SiO₃ is used (compare the result for Examples 3 and 4).

For the avoidance of doubt, the entire contents of prior art documents cited herein are incorporated herein by reference.

The invention claimed is:

1. A $NO_x$ absorber catalyst comprising two or more layers disposed on a substrate monolith, wherein a first layer comprises a $NO_x$ storage component comprising caesium silicate ($Cs_2SiO_3$) and at least one platinum group metal; and a second layer comprises at least one alkaline earth metal.

2. The $NO_x$ absorber catalyst of claim 1, wherein the first layer is disposed above the second layer.

3. The $NO_x$ absorber catalyst of claim 1, wherein platinum, palladium or both platinum and palladium are disposed in the second layer.

4. The $NO_x$ absorber catalyst of claim 1, wherein the first layer comprises the caesium silicate and the at least one platinum group metal supported on a refractory metal oxide support.

5. The $NO_x$ absorber catalyst of claim 4, wherein the refractory metal oxide support is selected from the group consisting of alumina, silica, titanic, zirconia, cerin, magnesia and mixtures, mixed oxides or composite oxides of any two or more thereof.

6. The $NO_x$ absorber catalyst of claim 4, wherein the refractory metal oxide support is doped with one or more of silica and rare earths.

7. The $NO_x$ absorber catalyst of claim 4, wherein the refractory metal oxide support also supports a rare earth oxide.

8. The $NO_x$ absorber catalyst of claim 7, wherein the rare earth oxide is cerin.

9. The $NO_x$ absorber catalyst of claim 1, wherein the at least one platinum group metal is selected from the group consisting of platinum, palladium, rhodium, and mixtures of two or more thereof.

10. The $NO_x$ absorber catalyst of claim 1, wherein the platinum group metal is rhodium.

11. The $NO_x$ absorber catalyst of claim 1, wherein the $NO_x$ storage component additionally comprises manganese.

12. The $NO_x$ absorber catalyst of claim 1, wherein the $NO_x$ storage component is produced by a method comprising the steps of combining and reacting an aqueous salt of at least one platinum group metal, an aqueous caesium salt and a source of silica.

13. An exhaust system for a lean-burn internal combustion engine comprising the $NO_x$ absorber catalyst of claim 1.

14. A motor vehicle comprising the exhaust system of claim 13.

15. A method of treating exhaust gas containing $NO_x$ from a lean burn internal combustion engine, which method comprising the steps of contacting a $NO_x$ absorber catalyst with lean exhaust gas containing $NO_x$ to adsorb $NO_x$ thereon; and periodically desorbing adsorbed $NO_x$ by contacting the $NO_x$ absorber catalyst with stoichiometric or rich exhaust gas, wherein the $NO_x$ absorber catalyst comprises two or more layers disposed on a substrate monolith, wherein a first layer comprises a $NO_x$ storage component comprising caesium silicate ($Cs_2SiO_3$) and at least one platinum group metal; and a second layer comprises at least one alkaline earth metal.

* * * * *